J. B. JONES.
Wheel Hub.

No. 82,530.

Patented Sept. 29, 1868.

Witnesses.
Wm. A. Morgan
G. C. Cotton

Inventor.
J. B. Jones
per Munn & Co.
Atty.

UNITED STATES PATENT OFFICE.

J. BLACKBURN JONES, OF SPARTA, ILLINOIS.

IMPROVED CARRIAGE-WHEEL.

Specification forming part of Letters Patent No. 82,530, dated September 29, 1868.

*To all whom it may concern:*

Be it known that I, J. BLACKBURN JONES, of Sparta, in the county of Randolph and State of Illinois, have invented a new and useful Improvement in Wheels for Vehicles; and I do hereby declare that the following is a full, clear, and exact description thereof, which will enable those skilled in the art to make and use the same, reference being had to the accompanying drawings, forming a part of this specification.

This invention relates to a new and improved wheel for vehicles, and of that class which are made of iron and wood combined.

The object of the invention is to overcome the difficulty attending wheels of this kind, to wit: the loosening of the wood portions of the wheel, which is due to the expansion of the iron in summer and the shrinking of the wood. This contingency is fully obviated by my invention.

Figure 1:
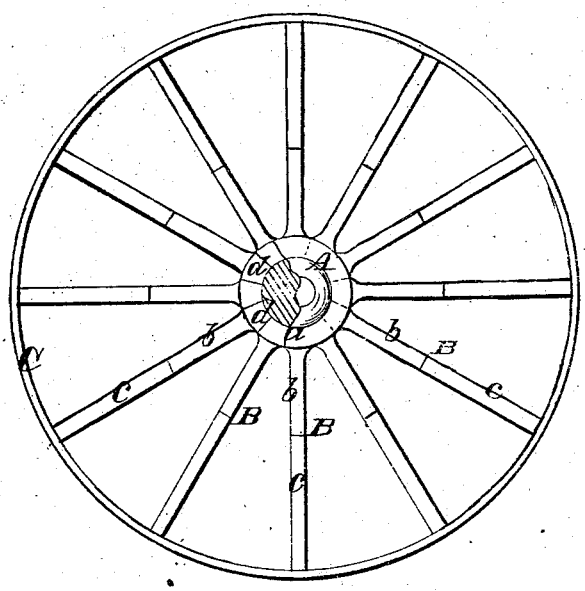
Figure 2:
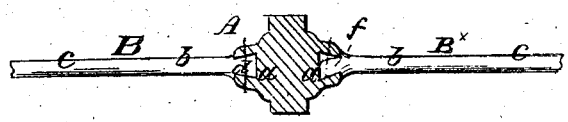

In the accompanying sheet of drawings, Figure 1 is a side view of a wheel constructed according to my invention, and having its hub partly in section; Fig. 2, a section of the same, the line of section passing through the center.

Similar letters of reference indicate corresponding parts.

A represents a hub of wrought or cast iron, having an opening through its center to receive the axle-box, indicated by dotted lines in Fig. 2. This hub is cast or made with a dovetail recess, $a$, which extends circumferentially around it at about its center.

The spokes B of the wheel are constructed of two parts, $b$ $c$, the part $b$ being metal, (malleable cast-iron being preferable,) and the other part, $c$, being wood. The metal part $b$ is cast with dovetail inner ends, as shown at $d$, and these dovetail ends are fitted in the dovetail recess $a$, the thickness of the dovetails $d$ being sufficiently narrow to admit of them entering the recess, the dovetails being turned after being fitted in said recess. These dovetails fit snugly against each other when they are all fitted in the recess $a$, and as the last spoke (designated by B×, Fig. 2) cannot be fitted in the recess $a$ like the others, there not being sufficient space to receive it, this spoke is provided with only a half-dovetail, $f$, and this half-dovetail is inserted in the recess in an oblique direction, as will be readily seen by referring to Fig. 2.

The outer ends of the metallic parts $b$ of the spokes are formed with sockets to receive the inner ends of the wooden parts $c$, and the outer ends of the spokes are secured in the rim C in the usual or any proper manner.

By this mode of construction, it will be seen that the spokes cannot become loose in the hub, as the former are all wedged tightly in the latter, and metal is in contact with metal, and, as wood does not shrink lengthwise of its grain, the wooden parts $c$ of the spokes will not shorten, but the metallic parts $b$ will lengthen somewhat under a warm temperature, and serve to tighten the spokes rather than loosen them.

This wheel may be constructed at a very moderate expense, may be readily repaired when necessary, as all the parts can be detached and adjusted together again without any trouble or difficulty, and will be extremely durable.

Having thus described my invention, what I claim as new, and desire to secure by Letters Patent, is—

The metallic hub A, provided with a dovetail recess, $a$, extending circumferentially around it in connection with the wooden spokes B, with metal sockets at their lower ends, and provided at their inner ends with dovetail tenons $d$ fitted in the hub, substantially as shown and described.

The above specification of my invention signed by me.

J. BLACKBURN JONES.

Witnesses:
   FRANK BLOCKLEY,
   ALEX. F. ROBERTS.